UNITED STATES PATENT OFFICE.

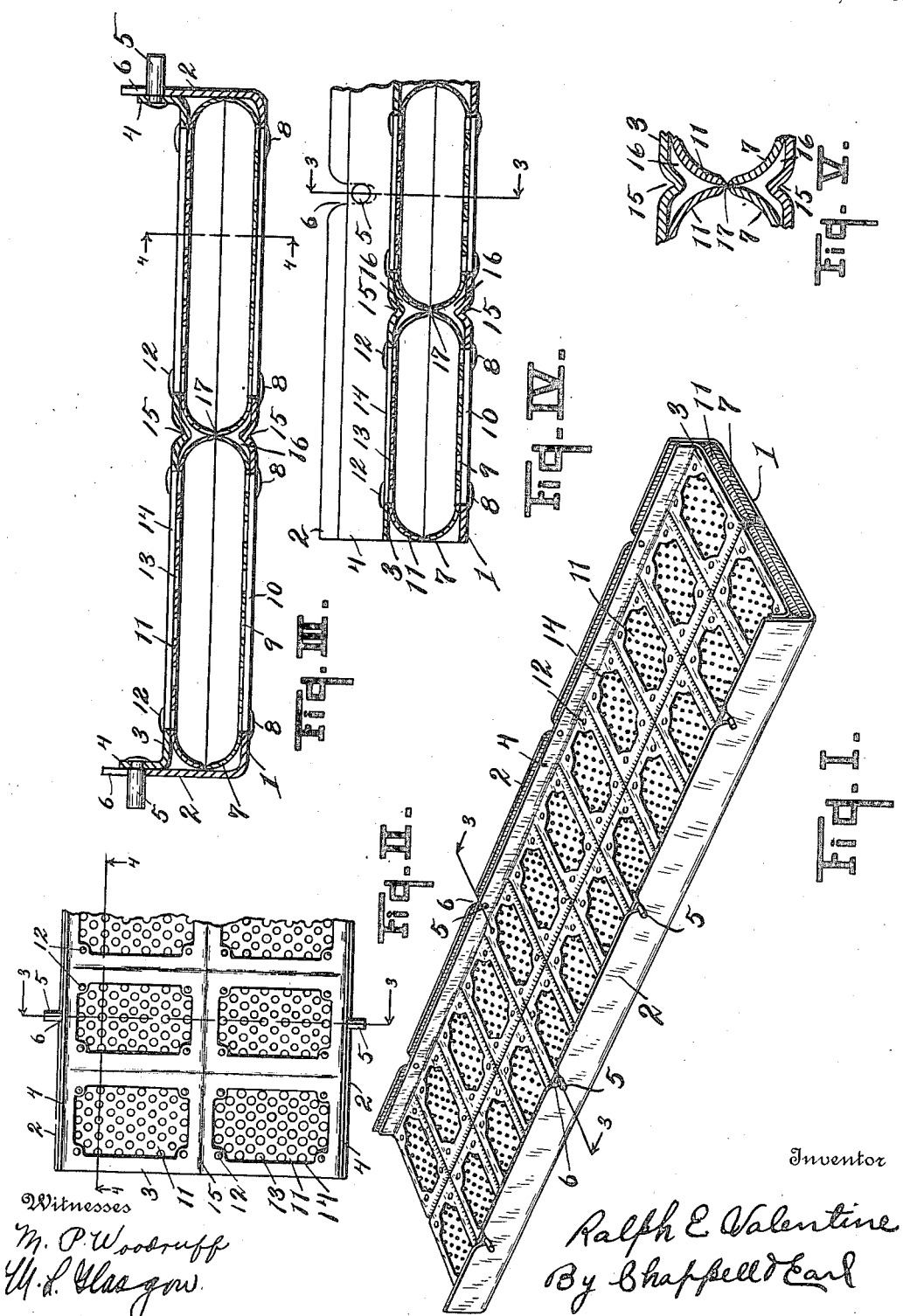

RALPH E. VALENTINE, OF BATTLE CREEK, MICHIGAN, ASSIGNOR TO KELLOGG TOASTED CORN FLAKE CO., OF BATTLE CREEK, MICHIGAN.

BAKING-PAN AND MOLD FOR BISCUITS.

1,124,363.  Specification of Letters Patent.  Patented Jan. 12, 1915.

Application filed January 24, 1912. Serial No. 673,214.

*To all whom it may concern:*

Be it known that I, RALPH E. VALENTINE, a citizen of the United States, residing at Battle Creek, Michigan, have invented certain new and useful Improvements in Baking-Pans and Molds for Biscuits, of which the following is a specification.

This invention relates to improvements in baking pans and molds for biscuits, particularly biscuits like shredded wheat or biscuits made from flaked cereals and the like.

The objects of this invention are: first, to provide a baking tray or mold in which the biscuits are cut and molded and retained in the forms during the baking process and with means for securing even baking without scorching or excessive browning of the edges of the biscuits. Second, to provide improved means of insuring register of the parts together so that the biscuits will be molded accurately without waste of material, the mass of which is distributed within the pan.

Further objects, and objects relating to details and economies of construction and operation will definitely appear from the detailed description to follow.

I accomplish the objects of my invention by the devices and means described in the following specification. The invention is clearly defined and pointed out in the claims.

A structure constituting the preferred embodiment of my invention is fully illustrated in the accompanying drawing, forming a part of this specification, in which:

Figure I is a perspective view of a pan and mold embodying the features of my invention. Fig. II is a detail plan view of one end thereof. Fig. III is an enlarged detail sectional view taken on a line corresponding to line 3—3 of Figs. I, II, and IV, showing details of the pan part and the devices for clamping and securing the registering of the mold whereby the biscuits are properly cut from the material introduced into this pan or tray. Fig. IV is a detail longitudinal sectional view taken on a line corresponding to line 4—4 of Figs. II and III. Fig. V is an enlarged detail sectional view through the sides or edges of adjacent molds and the pan showing the form of the cutting edges and the protection of the molds from undue heat.

In the drawing, the sectional views are taken looking in the direction of the little arrows at the ends of the section lines, and similar numerals of reference refer to similar parts throughout the several views.

Referring to the numbered parts of the drawing, the tray 1 has vertical side flanges 2. The tray cover 3 is similarly formed with upturned vertical flanges 4 that fit closely between the side flanges 2 of the tray. Laterally extending register pins 5—5 are disposed at intervals on the side flanges 4 and fit into registering notches 6 in the vertical flanges 2 of the tray 1.

Disposed in the tray 1 are half biscuit molds 7, which are rectangular in form and are secured in place by rivets 8, (see particularly Figs. III, IV and V). These bottom molds are perforated to permit the ready escape of moisture and the penetration of heat and are disposed over apertures 10 in the tray so that there is only a thin layer of perforated sheet metal incasing the under side of the biscuit, which allows the heat to penetrate very readily and evenly brown the biscuit.

Exactly corresponding half molds 11 are secured to the under side of the tray cover 3 by suitable rivets 12—12. These upper half molds are perforated at 13, and the tray cover 3 is apertured at 14 so that there is but a thin layer of perforated sheet metal embracing the top side of the biscuit, which allows the heat to penetrate and brown at that point as well.

The precise form of the cutting edges 17 of the molds appears in Fig. V where it will be noted that the cutting edges of the molds are beveled on the inside and that the cutting edges of adjacent molds substantially coincide and the cut off dough or shredded or flaked mass is forced within the mold.

The tray 1 and the tray cover 3 are creased at 15—15 between the biscuit molds to strengthen the frame work and also to effectively locate and support the biscuit molds which are attached to the said tray and its cover and form an inclosed air space 16 between the molds. By this arrangement, the molds also serve as cutters for the dough or material which is to be molded and baked and by distributing a mass of material, such as shredded wheat or flakes in the tray and then inserting the cover 3 and forcing it to place, owing to the registering means, the damp dough will be cut off and there will be no wastage to take care of, the entire mass being properly formed into biscuits within the various molds.

The biscuits can be entirely baked in these molds as they can very readily aerate, or, if desired, after the same have become partially baked and set, the cover can be removed and the material be allowed to expand freely. It is very desirable, however, to preserve the biscuits exactly in form, and the correct amount of dough or prepared material is distributed in the tray 1 before the cover is shut down to cut the same and confine it within the molds. Where the biscuits are baked within the molds, undue browning of the thin edges is avoided by the inclosed air space 16.

Having thus described my invention, I desire to state that I have produced my improved baking pans and molds in the preferred form. However, I realize that they can be considerably modified in details and secure very satisfactory results without departing from my invention.

I desire to claim the invention specifically as illustrated, and also broadly as pointed out in the claims appended hereto.

Having thus described my invention, what I claim as new and desire to secure by Letters Patent is:

1. The combination in a baking pan and mold, of a tray with vertical flanged sides, with register notches therein, with apertures in the bottom thereof for receiving individual molds, a tray cover corresponding thereto with upturned flanged sides fitting within the tray sides with laterally extending register pins corresponding to the notches in the tray sides, also with apertures corresponding to those in the tray, half molds of perforated metal with their cutting edges in proximity to each other, rectangular in form entirely filling the said tray, with cutting edges beveled on the inner side of the upper edge, suitably disposed over apertures therein and secured thereto, and corresponding half molds of perforated metal on the under side of the tray cover suitably disposed beneath apertures in the said tray cover and secured thereto, the said tray and cover being suitably creased between said molds to reinforce and strengthen the same and form confined air spaces therebetween: all coacting substantially as described and for the purpose specified.

2. The combination in a baking pan and mold, of a tray with vertical flanged sides, with register notches therein, with apertures in the bottom thereof for receiving individual molds, a tray cover corresponding thereto with upturned flanged sides fitting within the tray sides with laterally extending register pins corresponding to the notches in the tray sides, also with apertures corresponding to those in the tray, half molds of perforated metal provided with cutting edges in proximity to each other, rectangular in form entirely filling the said tray, suitably disposed over apertures therein and secured thereto, and corresponding half molds of perforated metal on the under side of the tray cover suitably disposed beneath apertures in the said tray cover and secured thereto, the said tray and cover being suitably creased between said molds to reinforce and strengthen the same, all coacting substantially as described and for the purpose specified.

3. The combination in a baking pan and mold, of a tray with vertical flanged sides with register notches therein, with apertures in the bottom thereof for receiving individual molds, a tray cover corresponding thereto with upturned flanged sides fitting within the tray sides with laterally extending register pins corresponding to the notches in the tray sides, also with apertures corresponding to those in the tray, half molds of metal provided with cutting edges in proximity to each other, rectangular in form entirely filling the said tray and secured thereto, and corresponding half molds of metal on the under side of the tray cover suitably disposed beneath said tray cover and secured thereto, all coacting substantially as described and for the purpose specified.

4. The combination in a baking pan and mold, of a tray with vertical flanged sides with register devices, and with apertures in the bottom thereof for receiving individual molds, a tray cover corresponding thereto with upturned flanged sides fitting within the tray sides with register devices, also with apertures corresponding to those in the tray, half molds of metal provided with cutting edges in proximity to each other, rectangular in form entirely filling the said tray and secured thereto, and corresponding half molds of metal on the under side of the tray cover suitably disposed beneath said tray cover and secured thereto, all coacting substantially as described and for the purpose specified.

5. The combination in a baking pan and mold, of a tray with a series of half molds therein provided with suitable registering devices, and with cutting edges in proximity to each other, the said half molds entirely filling the said tray, and a tray cover with half molds secured to the under side thereof, corresponding to the tray with its half molds, provided with coöperating registering devices, as specified.

6. The combination in a baking pan and mold, of a tray with a series of half molds therein entirely filling the said tray, and provided with cutting edges in proximity to each other, and a tray cover with half molds secured to the under side thereof, corresponding to the tray with its half molds, as specified.

In witness whereof, I have hereunto set my hand and seal in the presence of two witnesses.

RALPH E. VALENTINE. [L. S.]

Witnesses:
FRANK J. HEATH,
FRANK A. FOSTER.